(12) United States Patent
Cocchi et al.

(10) Patent No.: US 10,750,756 B2
(45) Date of Patent: Aug. 25, 2020

(54) MACHINE AND METHOD FOR PRODUCING AND DISPENSING LIQUID OR SEMI-LIQUID CONSUMER FOOD PRODUCTS

(71) Applicant: ALI S.p.A., Milan (IT)

(72) Inventors: Gino Cocchi, Bologna (IT); Roberto Lazzarini, Reggio Emilia (IT); Gianni Zaniboni, Borgonuovo di Sasso Marconi (IT)

(73) Assignee: ALI GROUP S.R.L.—CARPIGIANI, Cernusco Sul (IT)

( * ) Notice: Subject to any disclaimer, the term of this patent is extended or adjusted under 35 U.S.C. 154(b) by 130 days.

(21) Appl. No.: 14/223,525

(22) Filed: Mar. 24, 2014

(65) Prior Publication Data

US 2014/0220194 A1 Aug. 7, 2014

Related U.S. Application Data

(62) Division of application No. 12/073,920, filed on Mar. 12, 2008, now Pat. No. 8,758,678.

(30) Foreign Application Priority Data

Mar. 12, 2007 (IT) .............................. BO2007A0163

(51) Int. Cl.
*A23C 7/02* (2006.01)
*A23G 9/22* (2006.01)
(Continued)

(52) U.S. Cl.
CPC ................ *A23C 7/02* (2013.01); *A23G 9/228* (2013.01); *A23G 9/281* (2013.01); *A23G 9/30* (2013.01);
(Continued)

(58) Field of Classification Search
CPC . A23V 2002/00; A23V 2200/10; A23L 3/003; A23L 3/001; A23L 3/00;
(Continued)

(56) References Cited

U.S. PATENT DOCUMENTS 4,590,852 A 5/1986 Mayer et al.
5,405,054 A 4/1995 Thomas
(Continued)

FOREIGN PATENT DOCUMENTS

EP 0543090 5/1993
EP 1716760 11/2006
(Continued)

OTHER PUBLICATIONS

Storgards, Erna; Process hygiene control in beer production and dispensing, p. 4, Apr. 2000.*
(Continued)

*Primary Examiner* — Erik Kashnikow
*Assistant Examiner* — Lela S. Williams
(74) *Attorney, Agent, or Firm* — Shuttleworth & Ingersoll, PLC; Timothy J. Klima

(57) ABSTRACT

A machine for producing and dispensing liquid and semi-liquid consumer food products such as ice creams, whipped cream, yogurt and the like comprises a container for a basic product of the consumer food product, a feed and treatment circuit for the basic product, comprising a feed pump, dispensing means positioned at an outfeed end of the feed and treatment circuit, and a device for checking the bacterial load of the product during production/dispensing; an electronic control unit controlling and regulating the various steps for measuring the bacterial load.

7 Claims, 7 Drawing Sheets

(51) Int. Cl.
 *A23G 9/28* (2006.01)
 *A23G 9/30* (2006.01)
 *A23L 3/00* (2006.01)

(52) U.S. Cl.
 CPC .............. *A23G 9/305* (2013.01); *A23L 3/001* (2013.01); *A23V 2300/00* (2013.01); *Y10T 436/117497* (2015.01)

(58) Field of Classification Search
 CPC ... A23G 9/52; A23G 9/00; A23G 9/30; A23G 9/305; A23G 9/288; A23G 9/04; A23G 9/12; A23G 9/14; A23G 9/16; A23G 9/166; A23G 9/22; A23G 9/225; A23G 9/28; A23C 7/02
 See application file for complete search history.

(56) References Cited

U.S. PATENT DOCUMENTS

| | | | | |
|---|---|---|---|---|
| 6,096,272 | A * | 8/2000 | Clark | G01N 21/253 422/64 |
| 6,677,132 | B1 | 1/2004 | Hofler et al. | |
| 7,527,817 | B2 * | 5/2009 | Geiger | A01J 11/06 426/422 |
| 2001/0008887 | A1 | 7/2001 | Choudary et al. | |
| 2003/0061994 | A1 | 4/2003 | Vijverberg et al. | |
| 2004/0175780 | A1 | 9/2004 | Li et al. | |
| 2004/0228953 | A1 | 11/2004 | Bigalke | |
| 2005/0059105 | A1 * | 3/2005 | Alocilja | G01N 33/5438 435/7.32 |
| 2006/0078998 | A1 | 4/2006 | Puskas et al. | |
| 2006/0079000 | A1 * | 4/2006 | Floriano | C12Q 1/04 436/164 |
| 2006/0243310 | A1 | 11/2006 | Cocchi et al. | |
| 2008/0189078 | A1 * | 8/2008 | Vok | B01F 5/0077 702/188 |

FOREIGN PATENT DOCUMENTS

| | | |
|---|---|---|
| JP | 61-092555 | 5/1986 |
| JP | 2003-000224 | 1/2003 |
| JP | 2003-076415 | 3/2003 |
| JP | 2003180180 | 7/2003 |

OTHER PUBLICATIONS

Holubova et al., Rapid detection of *Escherichia coli* in milk and cream by impedance measurement (Year: 2004).*

English translation of Oct. 1, 2013 Office Action issued by the Japanese Patent Office in counterpart Japanese Application No. 2008-060819.

European Search Report dated Jun. 5, 2008 for European Application No. EP08151689.

* cited by examiner

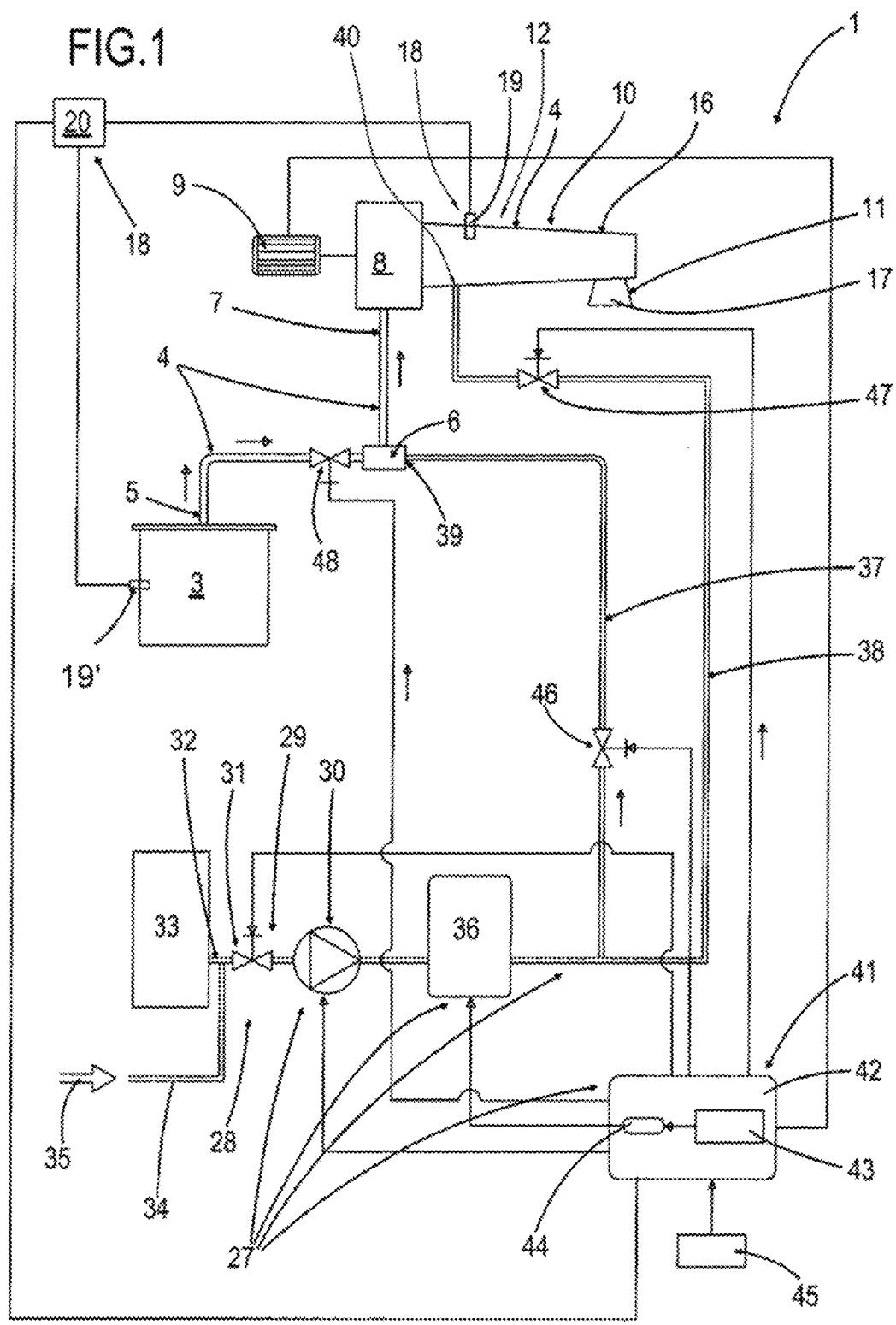

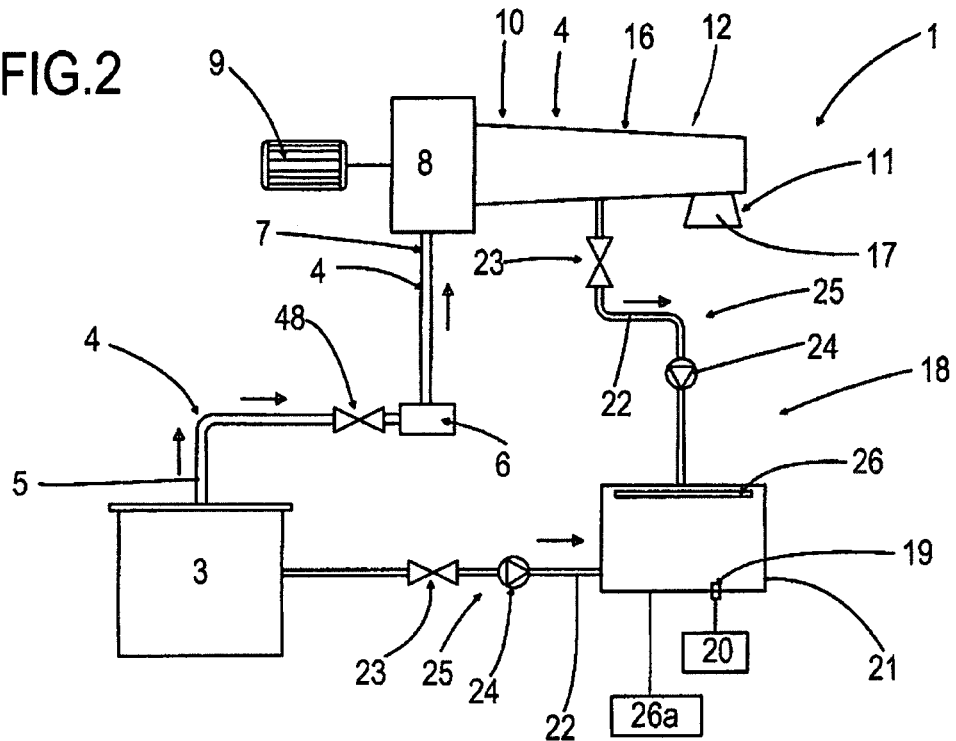
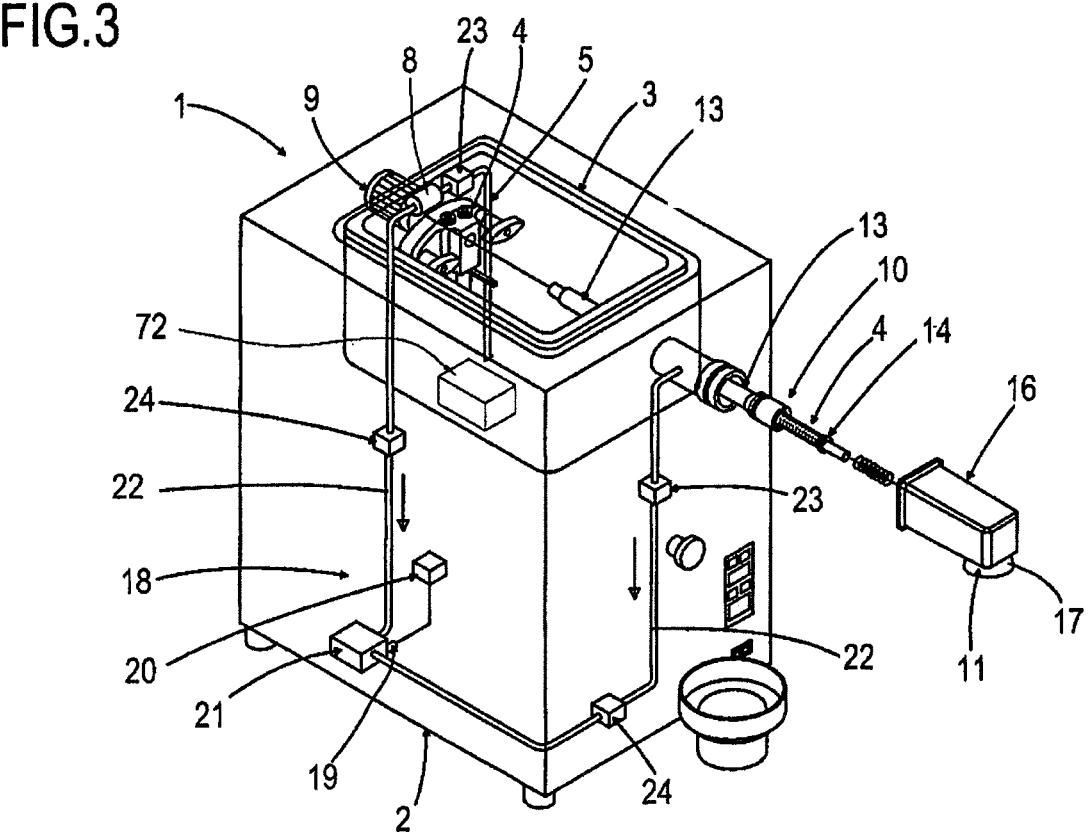

MACHINE AND METHOD FOR PRODUCING AND DISPENSING LIQUID OR SEMI-LIQUID CONSUMER FOOD PRODUCTS

This application is a divisional of U.S. patent application Ser. No. 12/073,920 filed Mar. 12, 2008, which claims priority to Italian Patent Application BO2007A000163 filed Mar. 12, 2007. The entirety of both applications are incorporated by reference herein.

BACKGROUND OF THE INVENTION

The present invention relates to a machine for producing and dispensing liquid and semi-liquid consumer food products.

The present invention can be used in systems for the milk—dairy sector and, more generally, in food industry process systems.

The present invention relates in particular, although without limiting the scope of the inventive concept, to machines for producing and dispensing crushed-ice drinks, sorbets, ice creams, soft ice creams, cream, yogurt and the like and to machines for producing and preserving mixtures for ice cream, creams, sauces, soups and mixtures in general and the like.

As is known, machines of the above-mentioned type comprise a container for the basic product, consisting for example of liquid cream, mixtures of products for ice cream, syrups and the like, and a feed circuit along which there are devices, including refrigerating means, for the treatment and processing of the basic product and at the outfeed end of which there are dispensing devices, consisting of nozzles or taps designed to allow collection of the finished product (whipped cream, ice cream, crushed-ice drink, etc.).

Partly because the products they treat are highly perishable, such machines are subject to frequent checks and maintenance work to guarantee that perfect hygienic conditions are maintained along the entire feed circuit.

In particular, the main problem of the above-mentioned machines for professional use is linked to the presence of milk-based mixtures and the consequent need to clean and sanitize the machines so as to prevent the proliferation of microbes.

At present, a preventive maintenance procedure is performed at predetermined intervals, from daily to twice-weekly depending on the features of the machines. For example, machines without integrated heat treatment devices must be sanitized at the latest every seventy two hours, whilst for automatic pasteurizing machines the interval is every two weeks.

With regard to this, European patent application EP1716760, by the same Applicant, relates to a machine for producing and dispensing liquid and semi-liquid consumer food products equipped with a washing device, used to introduce, in alternate steps, into the feed and treatment circuit a flow of fluid in the liquid state or steam, to allow circuit washing and sanitizing. A central processing unit controls and regulates the various washing and sanitizing steps.

Irrespective of whether or not the machine must be disassembled to carry out the cleaning or has integrated and automatic sanitizing devices, all of the operations performed are preventive and cannot guarantee total product sanitariness.

Events which are out of the ordinary that can occur during machine operation, or even during manual cleaning, expose parts of the machine to contamination by microbes and subsequent contamination of the product being processed.

Although there are methods for estimating the cell mass of a bacterial population, said methods require laboratory analyses, high costs, very lengthy periods of time and are applied, for example in the dairy sector, only for carrying out spot checks.

Moreover, since preventive maintenance procedures are carried out without any preliminary analysis, it is possible that they are performed when not really necessary, consequently wasting time and money.

SUMMARY OF THE INVENTION

The aim of the present invention is therefore to provide a machine for producing and dispensing liquid and semi-liquid consumer food products which is able to overcome the above-mentioned disadvantages. In accordance with the present invention this aim is achieved by a machine and a method for producing and dispensing liquid and semi-liquid consumer food products with the characteristics described in one or more of the claims herein.

BRIEF DESCRIPTION OF THE DRAWINGS

The technical characteristics of the invention, with reference to the above aims, are clearly described in the claims below and its advantages are more apparent in the detailed description which follows, with reference to the accompanying drawings which illustrate a preferred embodiment of the invention provided merely by way of example without restricting the scope of the inventive concept, and in which:

FIGS. 1 and 2 are schematic block diagrams of two embodiments, in accordance with the present invention, of a machine for producing and dispensing liquid and semi-liquid consumer food products;

FIGS. 3 and 4 are perspective schematic views, with some parts cut away and others exploded, of two machines made in accordance with the present invention;

DESCRIPTION OF THE PREFERRED EMBODIMENTS

Figure 4:
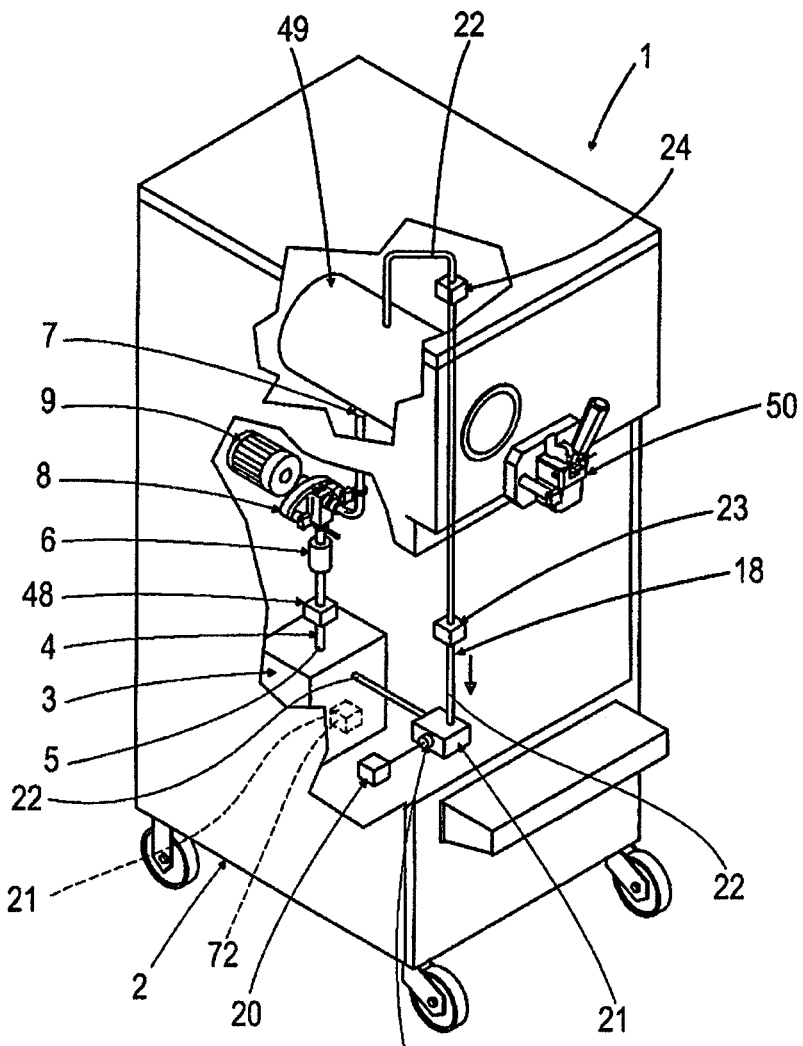

With reference to FIGS. 1, 2 and 3, the numeral 1 denotes as a whole a machine for producing and dispensing liquid or semi-liquid consumer food products and in particular a cream whipping machine. The machine 1, as also shown in FIG. 3, has a base 2 which substantially has the shape of a parallelepiped which houses a tank 3 for holding a basic product of the consumer food product, which in the case considered is liquid cream.

The numeral 4 denotes as a whole a cream feed and treatment circuit. The circuit 4 comprises a first pipe 5 connecting the tank 3 to a quick coupling and release joint 6, a second pipe 7 connecting the joint 6 and a pump 8, having a motor 9, for feeding the basic product to treatment means, labeled 10 as a whole and fitted at their outfeed end with dispensing means 11.

Figure 5:
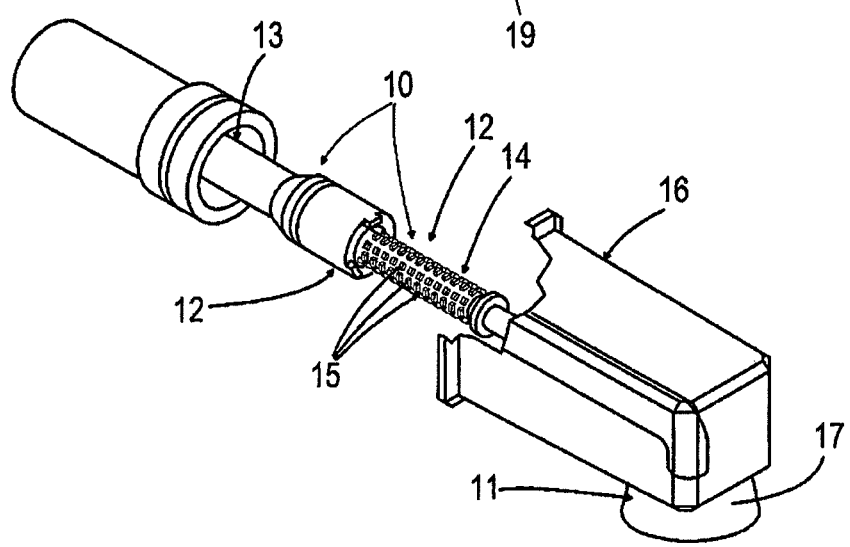
FIG. 5 is an enlarged schematic section of a detail from FIG. 3.

As illustrated in detail in FIG. 5, the treatment means 10 comprise an emulsifying homogenizer core 12 consisting of a tubular element 13 with a substantially horizontal axis, in which a cylindrical body 14 is inserted coaxially to it, the cylindrical body having a plurality of projections 15 on its outer surface, known to experts in the trade as a "Labyrinth".

Thus, between the inner surface of the tubular element 13 and the cylindrical body 14 a passage is formed for the liquid cream fed by the pump 8. The projections 15 are preferably positioned in such a way that along the passage they form winding paths which have the effect of increasing the collisions of the fat particles in the liquid cream, resulting in the absorption of air which whips the cream.

An end section of the tubular element 13 is positioned inside a box-shaped body 16 fixed to the outside of the base 2. Said box-shaped body supports below it and at its free end the dispensing means 11 consisting of a nozzle 17 connected to the free end of the tubular element 13.

A device 18 for checking the bacterial load of the consumer food product is also part of the machine 1. Said checking device 18 comprises at least one sensor 19, connected to an electronic control unit 20 and able to detect the size of the product bacterial load. Therefore, the sensor 19 can be operatively engaged with the consumer food product and/or with the basic product and, according to an embodiment illustrated in FIG. 1, may be installed in the tank 3 or in the feed and treatment circuit 4.

In particular, FIG. 1 illustrates one sensor 19 positioned in the emulsifying homogenizer core 12 and one sensor 19' positioned in the liquid cream tank 3. However, the sensors 19 and/or 19' could be positioned at different points of the feed and treatment circuit 4, for example in the first or second connecting pipe 5, 7.

In accordance with an alternative embodiment illustrated in FIGS. 2 and 3, the device 18 for checking the bacterial load comprises an analysis chamber 21 which is separate from the tank 3 and from the feed and treatment circuit 4.

The chamber 21 is in fluid communication with the container or tank 3 and/or with the feed and treatment circuit 4 by means of respective pipes 22 if necessary fitted with valves 23 and respective pumps 24. The pipes 22 together with the valves 23 and the pumps 24, form means 25 designed to draw a predetermined quantity of basic product and/or consumer food product and to place it in, or make it pass through, the chamber 21.

In the embodiment illustrated in FIGS. 2 and 3, the sensor 19 is mounted in the analysis chamber 21 and is again controlled by the electronic control unit 20.

The sensor 19 is preferably of the impedimetric type, that is to say, it measures an impedance value which is correlated to the concentration of any bacteria present.

In accordance with a first type of process, a single impedance measurement is directly correlated to the bacterial load present. Said first type of process provides an immediate result and is preferably used together with the sensors 19 positioned directly in the tank 3 and/or in the feed and treatment circuit 4 (FIG. 1).

Alternatively, in accordance with a second type of process, two or more impedance measurements are taken one after another to obtain an impedance curve as a function of time, there being the possibility of referring the trend of the curve to the bacterial load value. The speed of the increase in the bacteria is partly dependent on the initial concentration of bacteria. The second process is therefore based on measuring changes in the electrical properties of the product induced by the multiplication of the micro-organisms.

Said second type of process is preferably used with a sample of product to be treated "beside" the rest, that is to say, with the predetermined quantity of product extracted from the circuit 4 and introduced into the analysis chamber 21 (FIGS. 2 and 3).

To speed up bacterial replication and reduce analysis times, the analysis chamber 21 is preferably equipped with heating means 26, only schematically illustrated, which bring the above-mentioned predetermined quantity to a predetermined temperature "T", approximately between around 20° C. and 38° C. and preferably between around 34° C. and around 38° C.

Said heating is necessary for milk-based products treated (whipped cream, ice cream, crushed-ice drink, etc.) which during production are usually kept at lower temperatures to guarantee their preservation.

According to an alternative embodiment of the second process, the predetermined quantity is made to pass through a channel in the analysis chamber 21, where a concentration of bacteria occurs. The subsequent impedance measurement is taken on the bacterial load accumulated there.

However, in all of the cases described above, the variation in the impedance detected by the sensor 19 is translated into a bacterial load value by means of the control unit 20 electronics.

In practice, during a normal machine 1 production cycle, the device 18 for checking the bacterial load is automatically activated at predetermined time intervals, for example set using a user interface which is part of the electronic control unit 20, and at output supplies a value "C" representing the bacterial load present in the product contained in the tank 3 and/or in the circuit 4 or in the sample of product drawn from the tank 3 or the circuit 4.

Said value "C" may, for example, be communicated to the user by means of a graphical interface and/or sent to a machine central control unit which suspends production and if necessary starts a machine washing cycle.

More specifically, the value "C" detected is compared in the control unit with a preset reference value "R" or reference range "ΔR". If the value "C" detected exceeds the preset value or falls outside the preset reference range "ΔR", the control unit issues an alarm signal, to warn the user, and/or automatically starts the washing cycle for the feed and treatment circuit 4 and/or for the tank 3 and/or for the dispensing means 11.

After performing the check, the quantity of product contained in the analysis chamber 21 is expelled from it. The chamber 21 is then preferably sanitized, to eliminate any bacteria which accumulated there and to make the chamber 21 ready for a new measurement.

For this purpose, sanitizing means 26a, schematically illustrated only in FIG. 2 are operatively connected to the analysis chamber 21.

These sanitizing means 26a allow the introduction into the chamber 21 of steam and/or washing liquids and are, for example, of the type described in European patent application EP 1 716 760 by the same Applicant, wholly referred to herein in order to provide a complete description.

A device for washing the feed and treatment circuit 4 is also preferably part of the machine 1. Said device, for simplicity illustrated only in FIG. 1 and labeled 27 as a whole, is for example of the type described in the above-mentioned patent application EP 1 716 760.

The washing device 27 comprises means 28 for introducing a washing fluid into the circuit. The fluid introduction means 28 comprise means 29 for connection to a washing fluid source and consist of pump means 30 connected at infeed, by valve means 31, to a feed pipe 32 for the washing fluid contained in a tank 33 and consisting of water and/or a sanitizing liquid. Alternatively, there may be a pipe 34 connecting the valve means 21 and the water mains schematically indicated with the arrow 35. The fluid introduction means also comprise heating or boiler means 36 for the water and/or sanitizing liquid, and a first and a second pipe 37, 38 connecting the heating means 36 respectively with a first outlet point 39 at the joint 6 and a second outlet point 40 at a tubular element 13 infeed.

The washing device 27 has control means 41 comprising a central processing unit 42 including timing means 43 and temperature regulating means 44 for the heating means 36.

The central processing unit 42 is controlled from a keyboard 45 which the operator uses to enter data, and is connected at output to the valve means 31, the pump means 30, the heating means 36 a valve 46 located along the first pipe 37, a valve 47 located along the second pipe 38, and another valve 48 located along the pipe 5, and finally to the motor 9.

The electronic control unit 20 which controls the device 18 for checking the bacterial load is also operatively connected to the washing device 27, to automatically control washing based on the analysis carried out by the device 18 for checking the bacterial load. For example, the machine 1 central control unit preferably unites both the electronic control unit 20 and the central processing unit 42.

FIG. 4 illustrates a machine 1 for producing ice cream, which differs from the machine 1 illustrated in FIG. 3 due to the fact that the feed and treatment circuit 4 comprises a "whipping and freezing" unit, labeled 49, consisting of a freezing cylinder connected to a refrigerating unit and housing a stirrer, of the known type and therefore not illustrated. In the front part of the cylinder there is a tap 50 for dispensing the ice cream.

In said embodiment, the analysis chamber 21 is in fluid communication with the whipping and freezing unit 49 and/or with the tank 3 by means of the pipe 22, and if present the valve 23 and the pump 24.

Alternatively, the analysis chamber 21 may be positioned in the tank 3, connected to a tank inner wall, and is of the type illustrated in FIG. 11 and described below.

Figure 6:
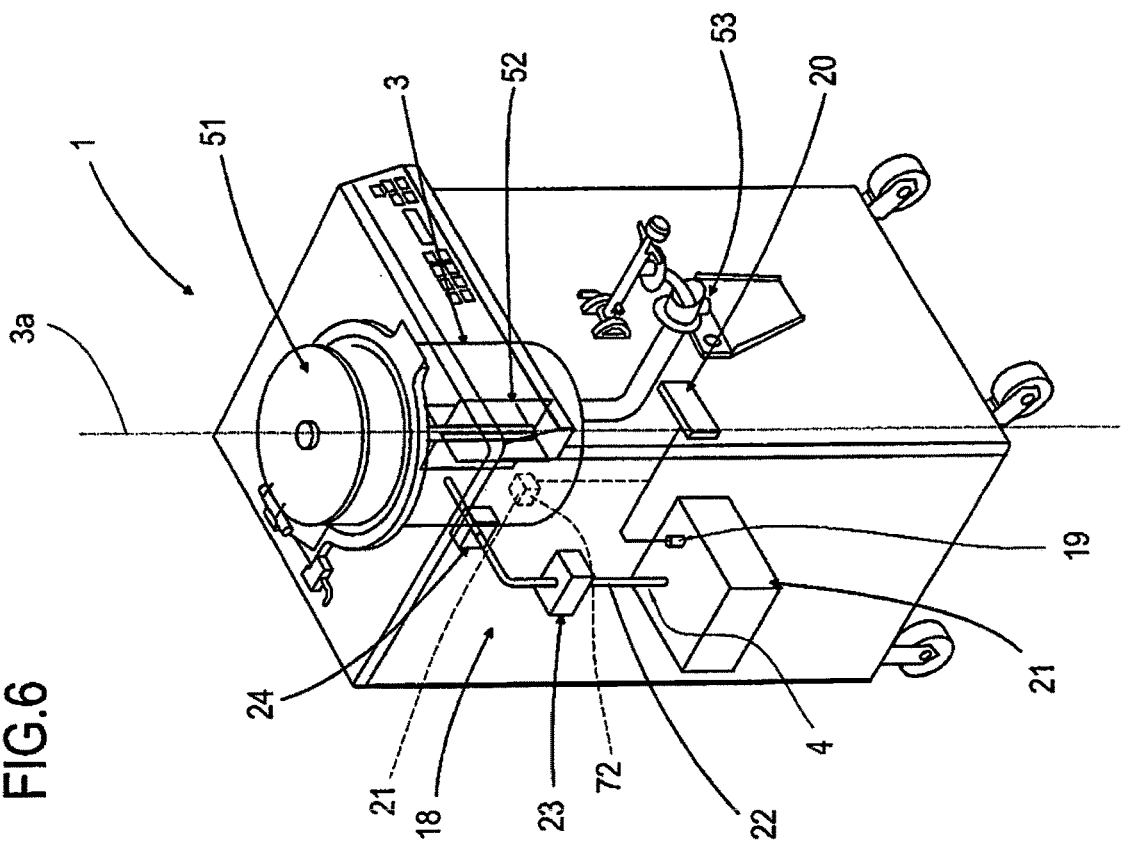
FIG. 6 is a perspective schematic view with some parts cut away and others drawn in dashed line style, of another machine made in accordance with the present invention.

FIG. 6 shows a machine 1 for producing, pasteurizing and preserving creams for fillings and coatings, color mixture for chocolate, fruit jams, mixtures in general, mixtures for ice creams, sauces and similar products.

In this case, the feed and treatment circuit 4 consists of a tank 3, having a vertical axis 3a, closed by a lid 51 and housing a stirrer 52, designed to stir the product. On the front of the machine 1 there is a tap 53 for dispensing the product from the tank 3. The tank 3 is equipped with an indirect heating device, of the known type and not illustrated, able to generate high cooking temperatures, as well as a refrigerating system, also not illustrated, which allows the product processed to be preserved in the machine at the end of the production cycle.

In said embodiment, the analysis chamber 21 is positioned inside the tank 3, as described below with reference to FIG. 11.

Figure 7:
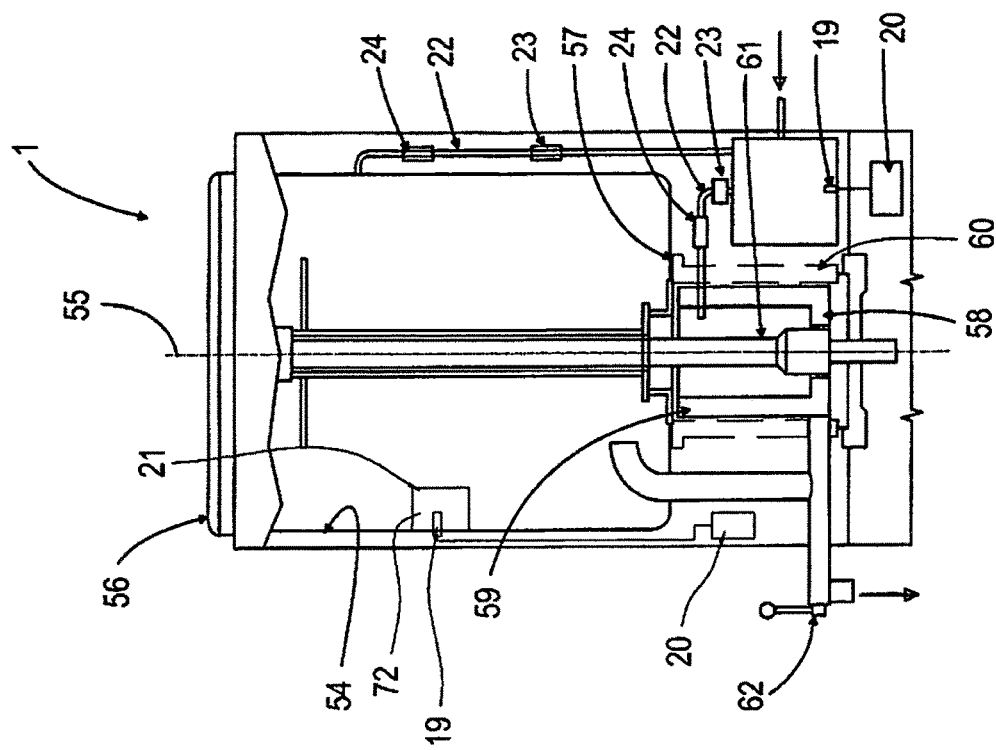
FIG. 7 is a schematic side view with some parts cut away and others drawn in dashed line style, of another type of machine made in accordance with the present invention.

FIG. 7 illustrates another machine 1 for producing and pasteurizing mixtures for ice cream and similar products.

In this case, the feed and treatment circuit 4 consists of a tank 54, having a vertical axis 55 and closed at the top by a transparent lid 56.

At its base 57 the tank 54 has a cup pump, labeled 58 as a whole, housed inside a substantially cylindrical compartment 59 around which there is a hot—cold heat exchange circuit 60, of the known type and schematically illustrated in dashed line style. The pump 58 has a stirrer with vanes 61, designed to stir the product. On the front of the machine 1 there is a tap 62 for dispensing the product from the tank 54.

In said embodiment, the analysis chamber 21 is positioned inside the tank 3, as described below with reference to FIG. 11.

Figure 8:
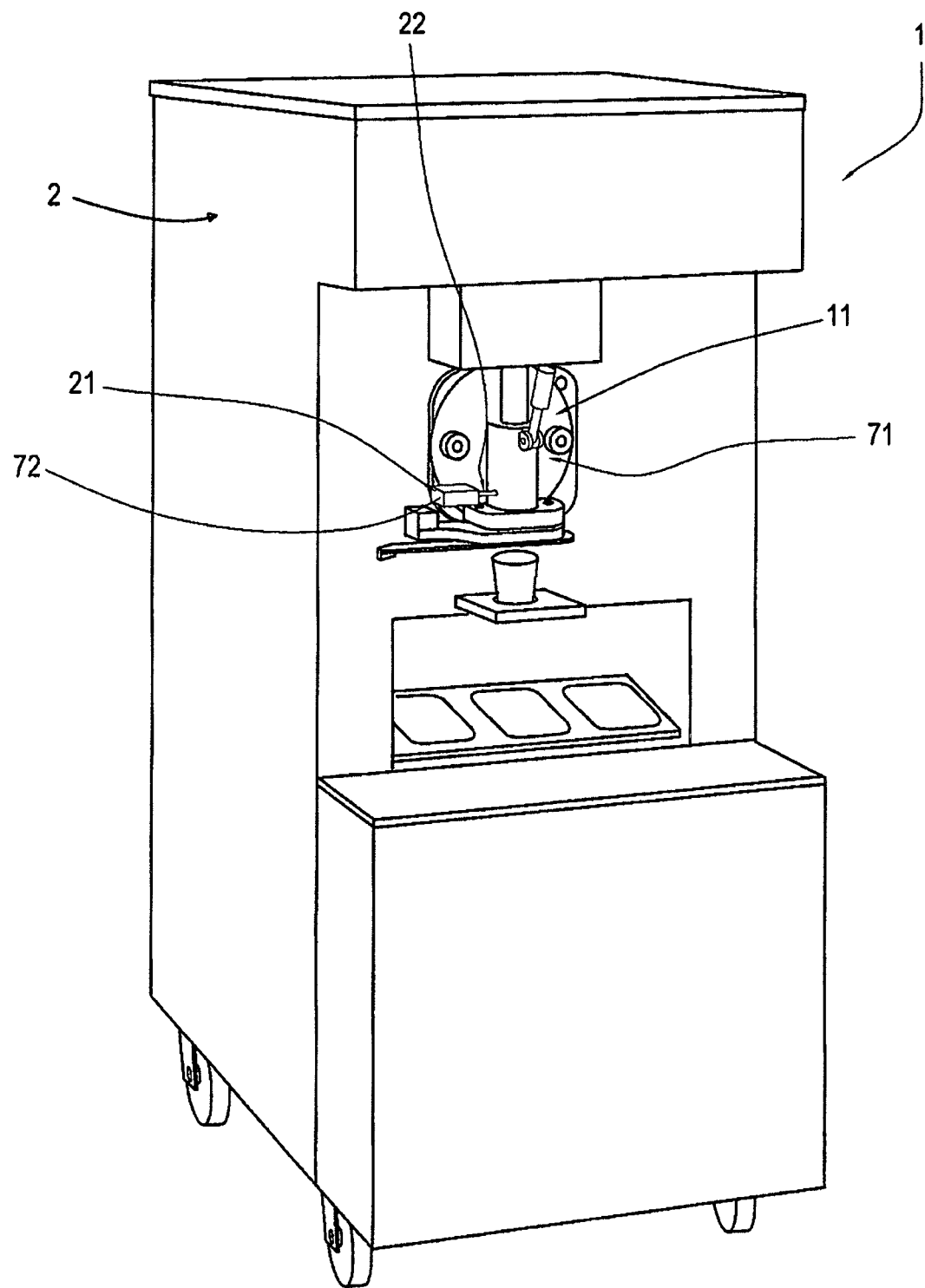
FIG. 8 is a perspective view of another machine made in accordance with the present invention.
Figure 9:
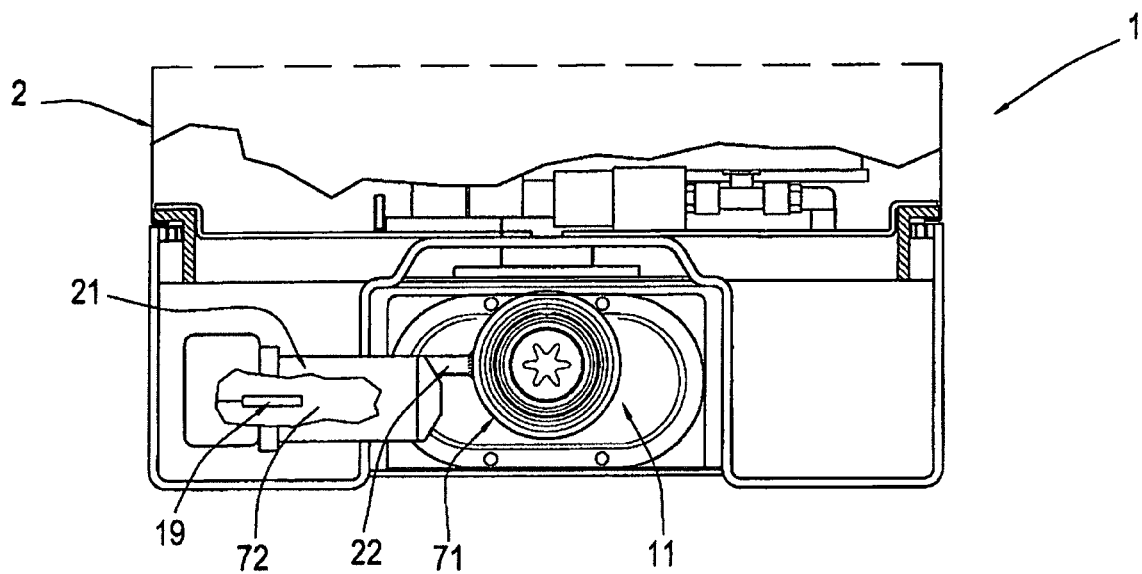
FIG. 9 is a top view, with some parts in cross-section, of the machine of FIG. 8.
Figure 10:
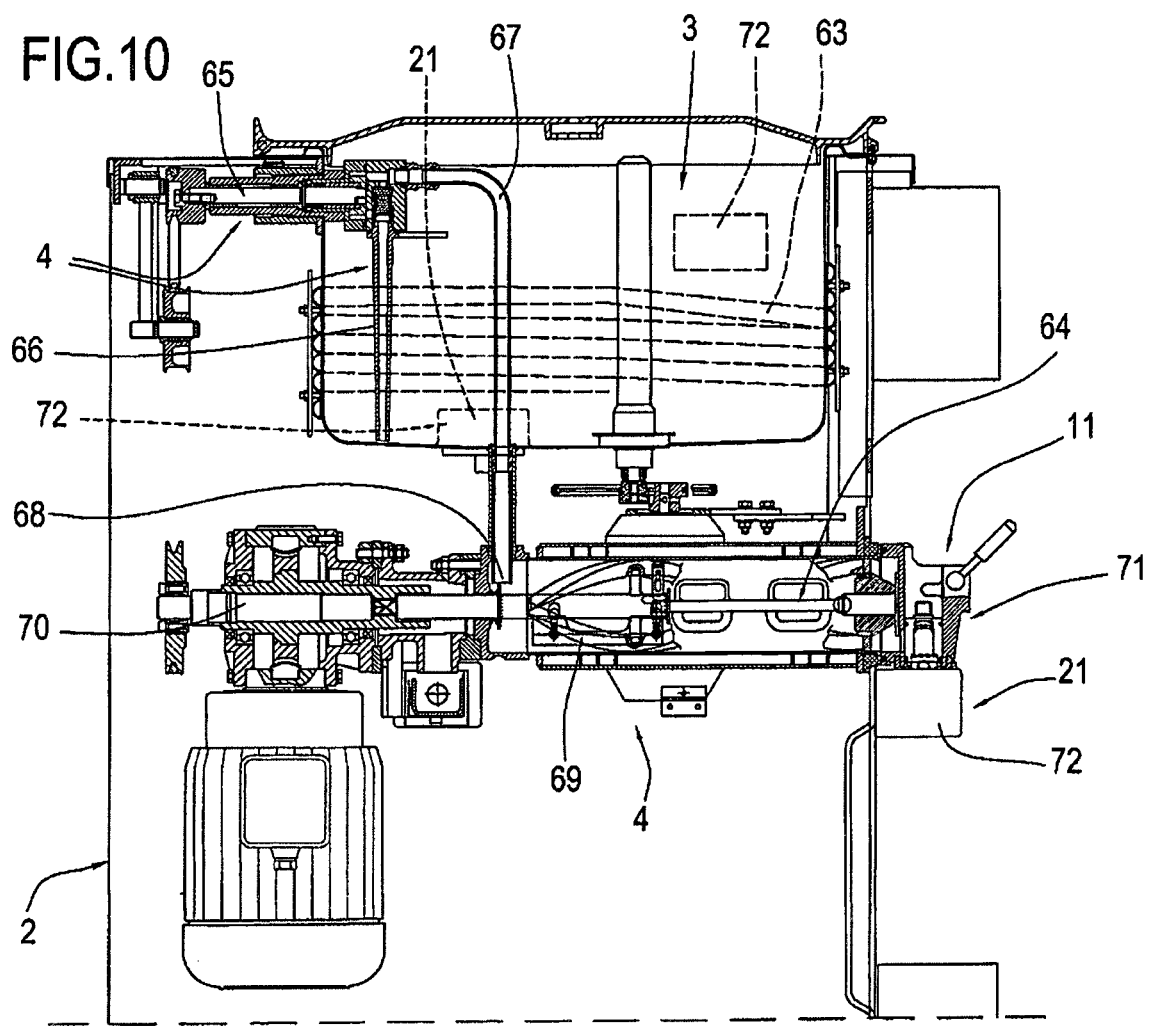
FIG. 10 is a side view, with some parts in cross-section, of the machine of FIG. 8.

FIGS. 8, 9 and 10 illustrate another machine 1 for producing ice cream. The machine 1 comprises a base 2 which substantially has the shape of a parallelepiped, the top of which supports the tank 3 for containing a basic product, in the form of a liquid mixture, to be processed to obtain ice creams. Connected to the tank 3 is a circuit 63 of a refrigerating system for keeping the mixture at a predetermined temperature, in particular around 4° C.

Below the tank 3, the base 3 supports a horizontal whipping and freezing cylinder 64, of the known type, to which the mixture is fed by a gear pump 65, positioned at the tank 3 and in communication with the tank via a suction pipe 66 for drawing the mixture from the tank 3 and sending it by means of a delivery pipe 67 to a whipping and freezing cylinder 6 infeed 68.

Inside the cylinder 64 there is a mixing blade 69 for the product treated, which is driven in rotation about its axis by a variable speed motor unit 70 and can push the product towards and into a dispenser tap 71 mounted on the whipping and freezing cylinder 64 outfeed front wall and forming the above-mentioned dispensing means 11.

It should be noticed that the pump 65, the suction pipe 66, the delivery pipe 67 and the cylinder 64 as a whole form the feed and treatment circuit 4 for the above-mentioned mixture.

According to that embodiment, the analysis chamber 21 is in fluid communication with the dispensing means 11, to draw the predetermined quantity from them.

In particular, the analysis chamber 21 is delimited by a box-shaped body 72 mounted on the front face of the machine 1 close to the dispenser tap 71 and connected to the latter by a pipe 22 (FIG. 9). The sensor 19, supported by the box-shaped body 72, gives onto the inside of the chamber 21. The analysis chamber 21 is also equipped with the above-mentioned heating means 26, not illustrated.

Figure 11:
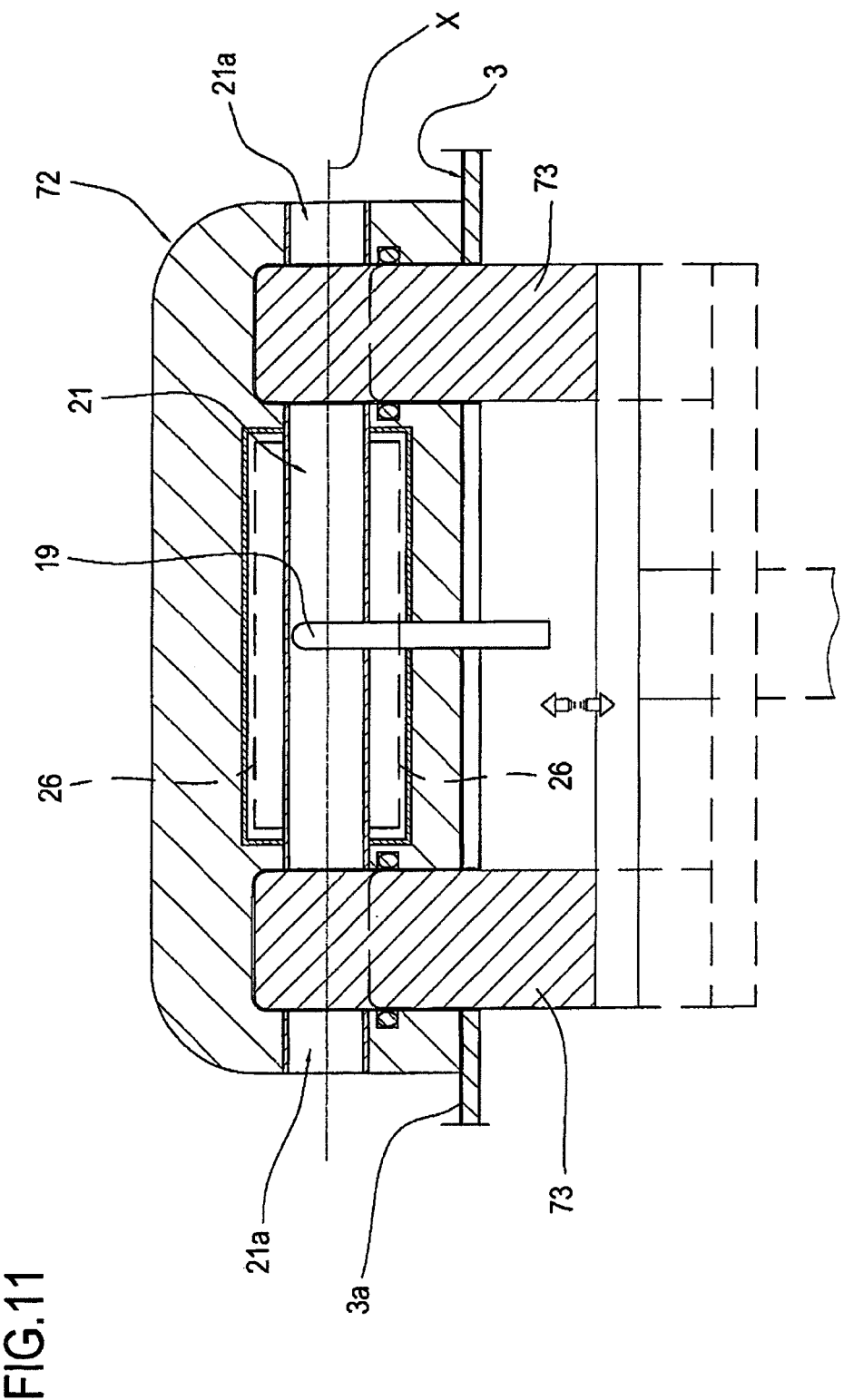
FIG. 11 is a cross-section of an element which can be applied to the machines shown in the previous figures.

FIG. 11 illustrates an alternative embodiment of the box-shaped body 72 which delimits the analysis chamber 21. The box-shaped body 72 may be applied, for example, to the inner wall 3a of the tank 3 of each of the machines 1 illustrated in FIGS. 3 and 6, as well as to the inner wall of the tank 54 of the machine in FIG. 7.

The analysis chamber 21 consists of a cylindrical pipe made inside the box-shaped body 72 and surrounded by electric heating elements which form the heating means 26.

The sensor 19 is inserted in the pipe 21 through a wall of the box-shaped body 72 and extends perpendicularly to the longitudinal axis "X" of the pipe 21.

The pipe 21 has opposite ends 21a in fluid communication with the tank 3 which houses the box-shaped body 72.

Both ends 21a of the pipe 21 can be closed by means of movable walls 73, which in the specific case illustrated consist of respective pistons which move by sliding, when the command is given by suitable actuators, not illustrated, along a direction perpendicular to the longitudinal axis "X" of the pipe 21.

Irrespective of the specific embodiment, if the box-shaped body 72 and the analysis chamber 21 are inserted in the tank 3, the quantity of product checked is not eliminated, but instead is put back into the tank 3 after undergoing a pasteurizing treatment. For this purpose, the heating means 26, or additional heating means suitably used, can bring the temperature of the quantity of product still in the analysis chamber 21 to a value (itself known and typically 70-80° C.) sufficient to cause said pasteurization.

Introducing the quantity of product into the pipe 21 and putting it back into the tank 3 are achieved by simply opening the ends 21a and making use of the continuous mixing of the product in the tank 3 for example by the stirrer 52 in FIG. 6, the stirrer 61 in FIG. 7 or the pump 65 in FIG. 10.

According to other embodiments, not illustrated nor described in detail, the device 18 for checking the bacterial load disclosed may also be installed on other food industry process systems, such as systems for the milk—dairy sector. In such a case, the number of sensors 19 and/or analysis chambers 21 used, their position and their structure will depend on the structure of the system and the dimensions of the containment tanks and/or the pipes in which the product to be checked is contained/through which it passes.

The device 18 for checking the bacterial load applied to the machines described in detail or to the systems indicated above could also be designed to check, as an alternative to or in addition to the bacterial load, other types of pollutants which may be present in the products being prepared.

The present invention achieves the preset aims and brings important advantages.

The possibility of detecting directly on the machine and continuously during machine operation, the bacterial load of the mixtures treated, allows the sanitariness of the food product being prepared to be guaranteed.

Moreover, such detection allows the activation, even without operator intervention, of machine sanitizing if the bacterial load detected exceeds the limits allowed. Said automation not only makes the machine intrinsically safer, but allows machine downtimes to be limited, production management optimized and costs contained.

The invention described above is susceptible of industrial application and may be modified and adapted in several ways without thereby departing from the scope of the inventive concept. Moreover, all details of the invention may be substituted by technically equivalent elements.

What is claimed is:

1. A method for preparing and dispensing liquid and semi-liquid consumer food products, comprising:
   providing a machine for producing and dispensing liquid or semi-liquid consumer food products, the machine including a container or tank, a feed and treatment circuit, a consumer food product dispenser and a bacterial load analysis chamber including a sensor positioned therein and a heater associated with the analysis chamber;
   preparing a basic product of the consumer food product in the container or tank,
   feeding the basic product though the feed and treatment circuit to the consumer food product dispenser,
   checking a bacterial load of the consumer food product during at least one step chosen from the preparing the basic product and a dispensing of the consumer food product,
   supplying a value indicating the bacterial load,
   comparing the value indicating the bacterial load with a preset reference value indicating hygienic operation, and
   automatically washing at least one chosen from the feed and treatment circuit, the tank and the dispenser if the value indicating the bacterial load exceeds the preset reference value,
   performing the checking the bacterial load of the consumer food product by drawing a predetermined quantity of at least one chosen from the basic product and the consumer food product, placing the predetermined quantity in the analysis chamber of the machine, or making the predetermined quantity pass through the analysis chamber, and detecting the bacterial load of the predetermined quantity,
   performing the detecting the bacterial load of the predetermined quantity by:
      heating the predetermined quantity with the heater to a predetermined temperature, to speed up bacterial replication,
      using the sensor positioned inside the analysis chamber for detecting a value indicating the bacterial load;
   performing the checking the bacterial load by detecting an impedance of the consumer food product;
   providing that the predetermined temperature is between around 20° C. and 38° C.;
   providing that the sensor is an impedimetric sensor;
   placing the impedimetric sensor in contact with the predetermined quantity in the analysis chamber;
   providing that the heater is associated with the analysis chamber and heating the predetermined quantity inside the analysis chamber;
   providing that the analysis chamber is cylindrical and the impedimetric sensor extends into the analysis chamber perpendicularly to a longitudinal axis of the analysis chamber;
   after the checking of the bacteria load, performing a sanitizing phase by introducing at least one chosen from steam and washing liquid into the analysis chamber;
   performing the detecting the impedance of the consumer food product by performing two or more impedance measurements of the consumer food product taken one after another to obtain an impedance curve as a function of time;
   providing at least one chosen from:
      a stirrer positioned in the container or tank, and
      a pump operatively connected to an interior of the container or tank,
      for providing a continuous mixing of the at least one chosen from the basic product and the consumer food product in the container or tank;
   providing that the analysis chamber is positioned in the container or tank and that the analysis chamber includes a central chamber openable and closable by first and second movable walls positioned on opposite ends of the central chamber;
   pasteurizing, in the analysis chamber, the consumer food product checked;
   opening the first and second movable walls and using the continuous mixing of the at least one chosen from the basic product and the consumer food product in the container or tank to discharge the pasteurized consumer food product from the analysis chamber into the container or tank, and then sanitizing the analysis chamber;

wherein the sanitizing is carried out by introducing at least one chosen from steam and washing liquids into the analysis chamber;

providing an electronic control unit for comparing the value indicating the bacterial load with the preset reference value;

providing the machine with a washing device for performing the automatic washing;

providing that the electronic control unit automatically controls the washing device to perform the automatic washing upon determining that the bacterial load exceeds the preset reference value.

2. The method according to claim 1, wherein the checking of the bacterial load is carried out automatically.

3. The method according to claim 1, wherein the checking of the bacterial load is carried out at predetermined time intervals.

4. The method according to claim 1, and further comprising issuing an alarm signal if the value indicating the bacterial load exceeds the preset reference value.

5. The method according to claim 1, wherein the method is applied in a process system for a food industry.

6. The method according to claim 1, wherein the method is applied in a process system for dairy products.

7. The method according to claim 1, wherein the predetermined temperature is between around 34° C. and around 38° C.

\* \* \* \* \*